Figure 1:
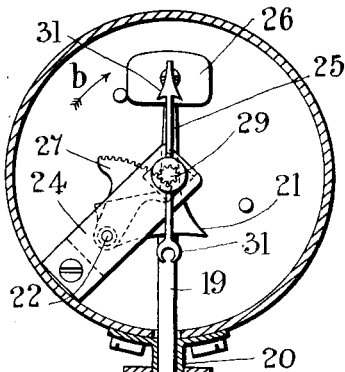

H. M. CALDWELL & T. SMITH.
GAS REGULATOR.
APPLICATION FILED NOV. 15, 1909.

1,064,609.

Patented June 10, 1913.
2 SHEETS—SHEET 1.

Witnesses:
John W. Thompson
Edward E. Back.

Inventors:
Henry Malcolm Caldwell and Thomas Smith
by Liddle Wendell & Varney, Attys.

H. M. CALDWELL & T. SMITH.
GAS REGULATOR.
APPLICATION FILED NOV. 15, 1909.

1,064,609.

Patented June 10, 1913.

2 SHEETS—SHEET 2.

UNITED STATES PATENT OFFICE.

HENRY M. CALDWELL AND THOMAS SMITH, OF LONDON, ENGLAND.

GAS-REGULATOR.

1,064,609.  Specification of Letters Patent.  Patented June 10, 1913.

Application filed November 15, 1909. Serial No. 528,135.

*To all whom it may concern:*

Be it known that we, HENRY MALCOLM CALDWELL, mining engineer, a subject of the King of Great Britain, residing at No. 2 Prince of Wales road, Kentish Town, London, England, and THOMAS SMITH, gas engineer, a subject of the King of Great Britain, and residing at 72 Castle road, Kentish Town, London, England, have invented certain new and useful Improvements in Gas-Regulators, of which the following is a specification.

This invention relates to apparatus for governing or regulating the pressure or supply of gas by means of a chamber having a flexible diaphragm extending across the same, a gas inlet to said chamber guarded by a suitable valve, a gas outlet to said chamber and a rod attached to said valve and to said diaphragm so that as the latter is influenced by changes of pressure the said valve is operated. The valve may be made of any suitable shape (*e. g.* cone shaped) and adapted to fit and work up against a correspondingly shaped valve seating and may be so attached to the said diaphragm that as the latter is subjected to pressure within the said chamber the valve is moved in the direction of its seating so as to close or partially close the same.

Now by the means according to the present invention the gas inlet valve is subjected to a pressure constantly tending to open or keep same open and varying according to the degree to which the said valve is open. We also according to this invention provide a relief valve (spring or otherwise suitably actuated) which can come into operation to admit gas into the said chamber if and when the said inlet valve remains shut from any cause, *e. g.* through excessive pressure occurring in the gas mains. To this relief valve we may advantageously attach a special baffle plate or other suitable device or devices for baffling the entering gas or making the route of the entering gas more devious.

In conjunction with the foregoing we may, or may not, use an indicator or dial for observation exteriorly of the apparatus; and in those cases where such indicator or dial is employed, the indictor arm or an arm rigidly connected thereto may be provided with a suitable weight or counterbalance or otherwise provided with the aforesaid means for producing varying pressure on the aforesaid valve.

As showing a specific embodiment of our invention reference is made to the drawings forming a part of this specification and in which—

Figure 2:
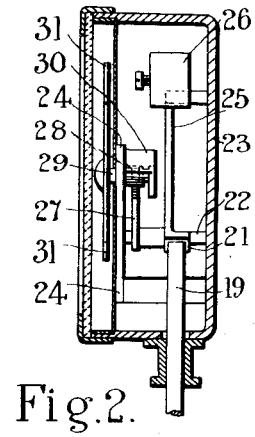
Figure 3:
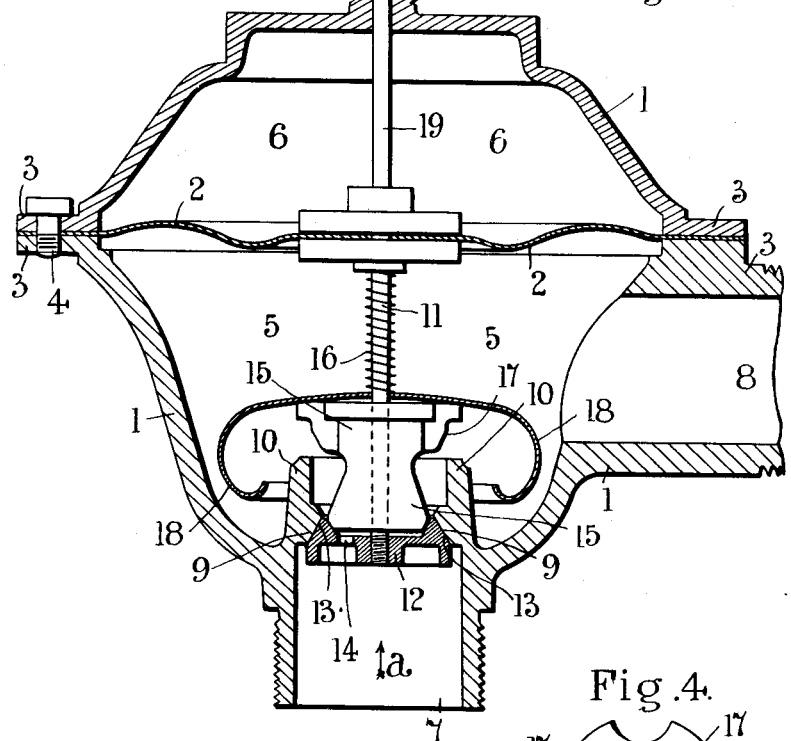
Figure 4:
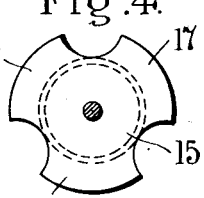
Figure 5:
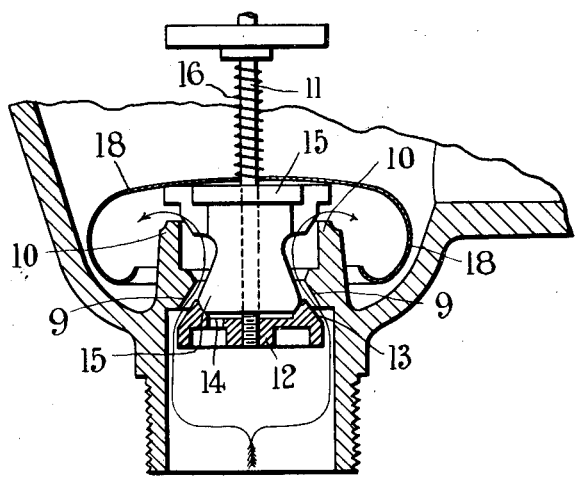
Figure 6:
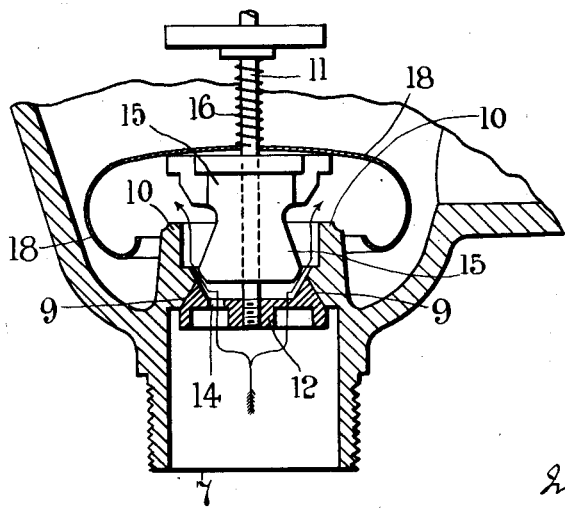

Figure 1 is a vertical sectional view of an apparatus for governing and regulating the pressure of gas or the supply of gas; an indicator also being shown in conjunction with such apparatus. Fig. 2 is a vertical sectional view (at right angles to Fig. 1) of the indicator and means for imparting varying pressure upon or differentially acting upon—and in conjunction with—the valve or valves controlling the inlet from the gas main into the apparatus. Fig. 3 is an underside plan of the special valve for controlling the inlet from the gas main into the apparatus, *i. e.* Fig. 3 is a view of the underside of said valve looking in the direction of the arrow *a* Fig. 1. Fig. 4 is a local view (looking downward) of the secondary valve or relief valve forming the upper part of the aforesaid special valve. Fig. 5 is a local view of the special valve part and its seating, showing the special valve open so as to admit gas under normal pressure from the main. Fig. 6 is a similar view to Fig. 5, but showing the position the parts of the valve (or valves) will assume under abnormal pressure in the main—viz., the special valve is shown forced against its seating by the excessive pressure in the main, and the secondary valve or relief valve is shown in the position to which it would be raised by said abnormal pressure in the main.

1 is a vessel or casing (of metal or other suitable material) which is divided entirely into two compartments by a suitable septum or partition such as the flexible diaphragm 2 which latter may be of any gas-tight material such as rubbered textile fabric, or may be made of rubber or leather or any other suitable material which may be treated in any suitable manner to render same gas-tight and suitable for the purpose. This vessel or casing 1 is advantageously formed in two parts, which parts may advantageously be provided with flanges 3, 3, bolted or clamped or otherwise secured together as for example by screws or bolts 4; and between these flanges the surrounding edge of the aforesaid septum may be placed and firmly clamped thereinbetween; or the septum or diaphragm 2 may be secured in position in any other desired or suitable manner in such wise that the lower compartment 5 is divided off in a gas-tight manner from the upper compartment 6.

7 is the main inlet from the gas main into the aforesaid lower gas-tight compartment 5; and 8 is the discharge outlet from said compartment 5 to the point or points to which the gas is to be led for combustion or otherwise. The casing 1 of the upper part of the gas inlet 7 is provided with a conical valve seating 9; and above said seating 9 this gas inlet 7 terminates at the upper edge or lip 10.

To the septum 2 is rigidly fixed the vertical rod or spindle 11 on the lower end of which latter is firmly fixed a special valve 12 which controls the inlet 7 from the gas main into the apparatus. The conical face 13 of this valve 12 is adapted to fit against the aforesaid conical seating 9. This valve 12 is provided with a series of vertical apertures 14 therethrough; the passage of gas through which passages 14 is normally prevented by the secondary valve or relief valve 15 which normally rests upon the said special valve 12 and against which it is normally kept pressed down by the spring 16, as well as by the weight of the secondary valve 15, which latter is otherwise free to slide vertically upon the spindle 11. The upper part of this secondary valve 15 is or may be provided with wings or extension pieces 17 tapering or conical on the underside and spaced apart from one another so that in the event of the valve descending too far said secondary valve will by means of these wing-pieces or extensions 17 rest upon the lip or upper edge 10 on the inlet 7 without cutting off the supply of gas coming through said inlet. The upper part of this secondary valve or relief valve 15 has fixed thereto or otherwise carries the special baffle plate or baffling devices 18, which latter in the example illustrated, is formed as a thin sheet metal spinning; this latter being secured to the secondary valve 15 so as to be raised and lowered therewith. Thus it will be readily seen that when excess of pressure arises in the main (e. g. should the pressure in the latter become greater than the normal pressure for which the apparatus is designed) thereupon the said gas pressure will force the special valve 12 against the seating 9 and would thus totally close the gas inlet 7 were it not for the secondary or relief valve 15 which is so weighted or so set and arranged as to be adapted to be raised off its seating on the valve 12 (e. g. as illustrated in Fig. 6). When the secondary valve is raised off its seating on the valve 12 the gas can flow from the inlet 7 through the openings 14 in the valve 12 through the space between said last mentioned valve and the secondary or relief valve 15 to the compartment 5 and finally through the outlet 8. The flow of gas, in the manner just described, continues until the pressure in the main becomes substantially normal whereupon the spring, or springs, 11 will cause the relief valve 15 to be reseated on the valve 12, which will resume its regulating function.

19 is the upper part of the spindle 11 which part 19 may either be continuous with said spindle 11 or rigidly attached thereto. This upper part 19 of the spindle 11 passes through the loose gland or stuffing box 20 over the top of the compartment 6; and at its top end this spindle 19 bears against the underside of a crank or lever 21 fixed or formed on a crank shaft or spindle 22 which latter is pivotally mounted at one end and in the casing 23 of the indicator and at the other end pivotally mounted in the fixed support 24 fixed in the front end of this indicator. On this crank shaft or spindle 22 there is rigidly mounted the upwardly extending arm 25 carrying the weight 26 on the upper end of said arm; and also there is rigidly fixed on this shaft or spindle 22, a toothed sector or quadrant 27, the teeth or curved rack on the edge of which gear with a pinion 28 on the spindle 29 which is pivoted at one end in the fixed mount 30 and the other end in the fixed mount 24; and on the front end of this spindle 29 there is fixed a needle of pointer 31—see Fig. 2. It will thus be seen that the arm 25 (carrying the weight 26) is free to travel, when rocked or swung behind the mounts 24 and 30; and furthermore whenever the same arm 25 is moved thereby the crank shaft or spindle 22 will rock or move the toothed sector 27 and thereby consequently the needle or indicator arm 31 will be moved or turned to correspond with any movement of said weighted arm 25.

The operation is as follows: When all the lights are turned off or all gas consumption stopped so that passage of gas through the outlet 8 is stopped; thereupon the pressure will rise in the chamber 5 and force upward the flexible diaphragm 2 and this and the pressure in the main will force the special valve 12 up against its seating 9 and hold it there, and thereby the spindle 11, 19 is forced to its highest point, and the top end 19 of this spindle acting on the crank arm or lever 21 forces the latter upward until the upright weighted arm 25 is brought to the position where the needle or pointer will indicate on the dial that no gas is passing i. e. that no lights, etc., are burning. If now the burner is lighted, this will reduce the pressure in the chamber 5 and thereupon the reaction of the flexible and weighted diaphragm 2 will tend to force the valve 12 downward a very slight distance, and thus move the valve 12 slightly off its seating;

the downward movement of this spindle 11, 19, thus allowing the weighted arm 25 to rock or move a very slight distance to the right (i. e. in the direction of the arrow b see Fig. 1) and this will bring the valve 12 into a state of equilibrium and said valve will remain in this very slightly open condition until one or more further burners are lighted whereupon the special valve 12 will descend still farther so as to admit a proportionate further supply of gas to enter the apparatus, and simultaneously the weighted arm 26 will be moved a farther distance in the direction of the arrow b, and thus again by the action of this weighted arm establish a state of equilibrium of the valve 12; and as further burners are lighted (or further gas otherwise consumed) it will readily be seen that as the weighted arm 25 leaves its substantially vertical position the weight 26 on the outer end of said arm 25 will produce an increasing weighted action or differential action on the spindle 19, 11; and consequently this weighted arm will exert a varying downward pressure or differential action upon the special valve 12 according to the extent to which said valve is open i. e. according to the amount of gas which has to be allowed to pass for any number of lights etc. Furthermore as the weighted arm 25 moves in the direction of the arrow b as aforesaid the indicator needle or pointer 31 is correspondingly moved over the dial or index which latter may be marked with any suitable scale or index to thereby indicate the extent to which the valve is open at any given moment.

It will thus be seen that this apparatus will govern or regulate the pressure of gas delivered to the burner or burners or other point or points of consumption; such pressure of the gas delivered through this apparatus being determined according to the construction and adjustment of the apparatus viz:—this pressure is determined by the extent of the weights and strength of the springs acting on the spindle 11, 19.

In the event of any excessive pressure arising in the main above the normal pressure for which the apparatus is constructed and set or adjusted—if for example the apparatus is constructed for a normal pressure of 3 inches in the main and the pressure in the latter should rise beyond three inches— the effect of such excessive pressure would be to force the special valve 12 up against its seating and hold it there until the pressure in the main was again reduced to or below the normal pressure during which period of excessive pressure in the main such excessive pressure would stop gas entering the apparatus and consequently would stop the supply of gas to the consumer; and to prevent this happening and to enable the apparatus to work under all conditions (i. e. whatever pressure may occur in the main) the relief valve 15 is provided, this relief valve being so weighted or regulated that while the pressure in the main remains at or below the normal pressure to which the apparatus is set—say 3 inches pressure in the main—the said relief valve will remain down upon its seating and keep closed the passage 14 through the special valve 12; but, on excess of pressure arising in the main, this excess pressure will force the relief valve 15 upward off its seating, and admit gas through the passage 14 into the chamber 5 and thereby allow the apparatus to work (as hereinbefore described) even when excessive pressure arises in the main.

Instead of employing the upwardly extending arm 25 (carrying the weight 26 on the upper end thereof) and the intermediate mechanism as described between said weighted arm 25 and the spindle 19 for transmitting varying pressure from said weighted arm to said spindle as hereinbefore described; it will be obvious that we may employ or provide any suitable alternate method and means of imparting such varying pressure—in a downward direction only—to said spindle in order to tend to open the gas valve or to keep same open.

What we claim is:—

1. In a device of the class described, the combination of a chamber provided with an inlet opening, an outlet opening, a valve seated in the inlet opening, a diaphragm extending across the chamber, and a variable pressure means; the valve in the inlet opening, the diaphragm and the variable pressure means being operatively connected so that when the pressure from the source of supply exceeds a certain amount, the valve will become seated, said valve being provided with an opening closed with a relief valve whereby when the valve in the inlet opening becomes seated gas can pass into the chamber.

2. In a device of the class described, the combination of a chamber provided with an inlet opening, an outlet opening, valve operating means operated by the pressure of gas within the chamber, said valve which is in the inlet opening being provided with an opening passing therethrough and a relief valve seated thereupon to permit gas to pass from the source of supply into the chamber when the pressure becomes too great and spring means between the valve operating means and the auxiliary or relief valve to hold the latter in place.

3. In a device of the class described, the combination of a chamber provided with an inlet opening, a valve seated therein which in order to be opened must be moved against the pressure of the supply, said valve provided with an opening and a rod connecting it to the valve operating mechanism, an auxiliary relief valve adapted to close said opening and slidably mounted on said rod and spring means between the rod and the auxiliary valve to hold it normally in place.

4. In a device of the class described, the combination of a chamber provided with inlet and outlet openings, a valve seated in the inlet opening which in order to open must be forced against the pressure from the source of supply, said valve provided with an opening leading from the source of supply to the interior of the chamber operating means connected to said valve, a spring pressed auxiliary valve which normally keeps the opening of the first mentioned valve closed and a baffle member located between the spring of the auxiliary valve and the inlet opening.

In witness whereof we have hereunto set our hands in the presence of two witnesses.

H. M. CALDWELL.
THOMAS SMITH.

Witnesses:
 EDWIN GANDER,
 H. D. JAMESON.